Dec. 19, 1939. L. G. SYMONS 2,183,660
SCREEN
Filed Sept. 12, 1936 2 Sheets-Sheet 1
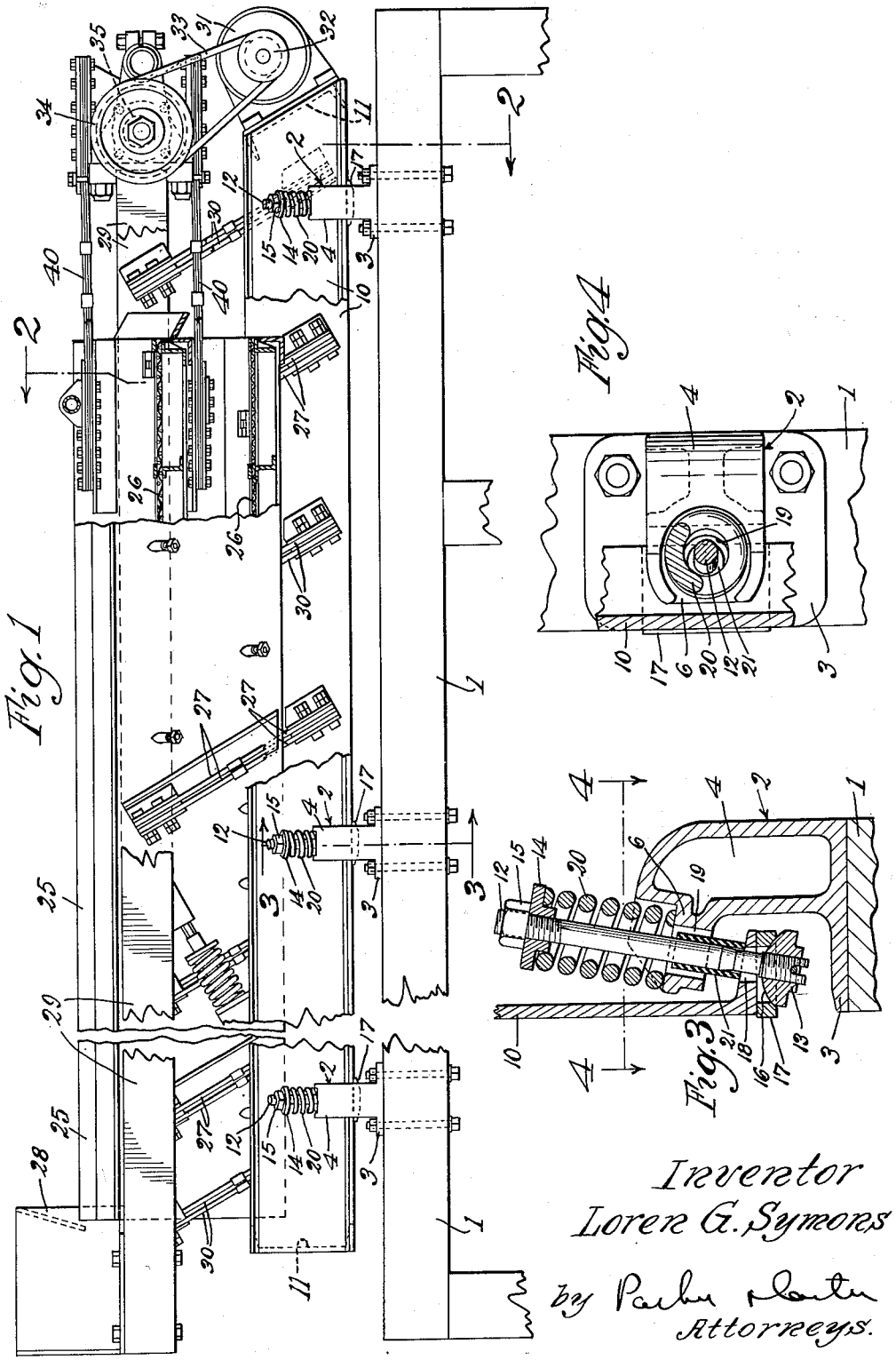
Inventor
Loren G. Symons
by Parker Carter
Attorneys.

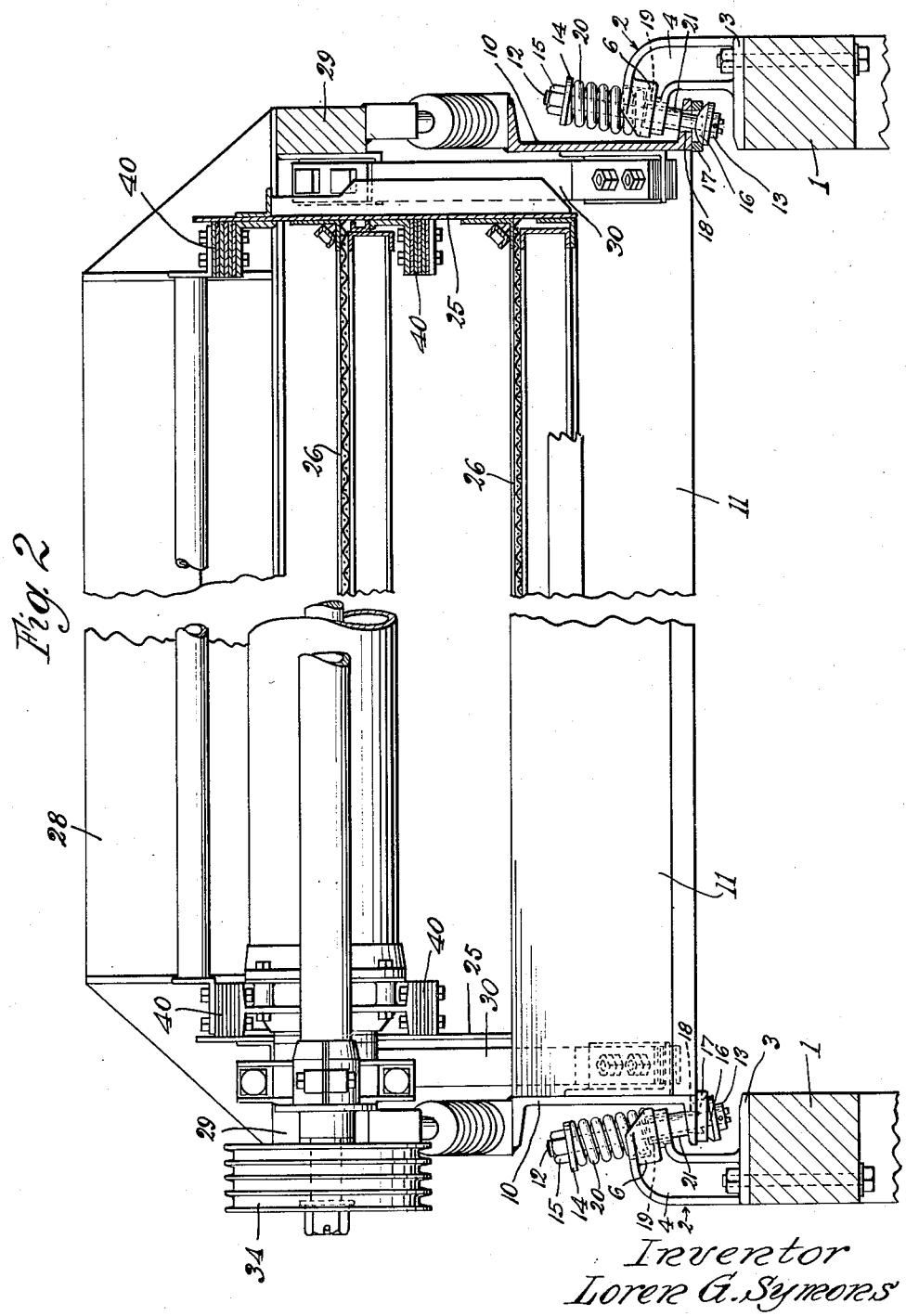

Patented Dec. 19, 1939

2,183,660

UNITED STATES PATENT OFFICE 2,183,660

SCREEN

Loren G. Symons, Hollywood, Calif., assignor to Nordberg Manufacturing Company, Milwaukee, Wis., a corporation of Wisconsin Application September 12, 1936, Serial No. 100,417

2 Claims. (Cl. 209—409)

My invention relates to an improvement in screens and means for supporting them.

One purpose is the provision of means for limiting or eliminating the transmission of vibration from a vibrating screen to the supporting structure for said screen.

Another purpose is the provision of improved means for permitting a slight vibration of the main frame of the screen, in response to the normal operation of the screen, while preventing the transmission of such vibration to the base or supporting structure.

Another purpose is the provision of improved means for permitting slight vibration of the screen main frame, while preventing any substantial movement of misalinement of the main frame.

Other purposes will become evident from a reading of the specification and claims.

I illustrate my invention more or less diagrammatically in the accompanying drawings wherein:

Figure 1 is a side elevation with parts broken away and parts in section;

Figure 2 is an enlarged end view with parts shown in section, the parts in section being taken substantially on the line 2—2 of Figure 1;

Figure 3 is an enlarged detail section taken on line 3—3 of Figure 1; and

Figure 4 is a section taken on the line 4—4 of Figure 3.

Like reference characters refer to like parts throughout the specification and drawings.

Referring to the drawings, I generally indicates any suitable base or foundation structure which may be of concrete, wooden beams, metal beams or the like. Mounted upon this base or foundation structure, I illustrate a plurality of brackets generally indicated as 2, each one provided with a bottom web or flange 3, an upstanding flange 4, with reinforcing webs 5, which support an upwardly and inwardly inclined spring seat or platform 6.

10, 10 indicate the channel members which, together with any suitable transverse supports 11, form the base or main frame of the vibratory screen. 12, 12 indicate guiding and supporting pins each shown with a bottom head 13 and an upper spring abutment 14, and a securing and adjusting nut 15. 16 indicates a generally spherically faced supporting member forming a part of the head 13. Interposed between it and the bottom of the channel flange is a concave spherical member 17. If desired, the concave spherical member 17 may be of yielding material, such as rubber, but is shown as of metal.

The pins 12 pass through apertures 18 in the channel members 10 and apertures 19 in the spring seats 6 which are of sufficient size to give slight clearance, whereby a limited but sufficient flexure or lateral movement of the pins 12 is permitted. 20 indicates coil springs compressed between the upper surfaces of the platform 6 and the lower faces of the abutment members or washers 14. The pins may be surrounded by short rubber sleeves 21 to prevent metal to metal contact between the pins 12 and spring seats 6 during vibration of the below described screen structure. The brackets may be made single as illustrated, but, if desired, may be made as double with two pins and springs associated with each bracket. Any desired number of said brackets may be spaced along each of the main frames or channels 10.

The screen structure mounted upon the main frame may, of course, be varied but I illustrate as an advantageous structure for employment with this type of support the structure below described. It may include, for example, a screen frame, generally indicated as 25, with any suitable screen cloth 26 thereon. The screen 25 may be supported for example by a plurality of leaf springs 27, secured in any suitable fashion to the inner faces of the channel members 12. A feed box 28 is shown at the feed end of the screen. Positioned along the side of the screen are weight bars 29, independently mounted upon the main frame channel members 10 by inclined leaf springs 30. The inclined springs supporting the weight members and the screen are shown as parallel with each other and as spaced along the channel members 10 at intervals. 31 indicates any suitable motor with a pulley 32 driving a belt 33, passing around a pulley 34, associated with a rotor structure the details of which are not herein indicated. It will be understood, however, that an eccentric is included as shown at 35 and that the rotation of the rotor varies effective distances between its axis of rotation and the screen 25. As a connection between the rotor structure with its attached weights and the screen 25, I illustrate a plurality of leaf springs 40, some being positioned above and some below the axis of rotation of the rotor 35.

It will be understood that, in response to the rotation of the motor 31, the rotor is rotated at a high rate of speed which may for example be in the neighborhood of 1500 to 2000 R. P. M., more or less. In response to this rotation, the effective distance between the rotor and the screens 26 is varied and the screens are rapidly vibrated upon the inclined springs 27. At the same time, the weights and the rotor structure are vibrated upon their own supporting springs 30, both the screens 26 and the rotor structure being thus flexibly floated upon the channel members 10 of the main frame of the screen. Very little vibration is transmitted to the main frame, but I find it advantageous also to float the main frame itself upon the structure above described.

It will be realized that, whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to the precise showing.

I claim:

1. In a screening device, a normally fixed base, an intermediate frame member positioned above said base, a plurality of yielding supporting connections between said base and said intermediate frame member, alined along a pair of opposite sides only of said frame member, said yielding connections including outwardly inclined stems secured to said intermediate frame member, abutments on said base, and coil springs surrounding said stems and compressed against said abutments, whereby a substantially longitudinal vibratory movement of the intermediate frame member in relation to the base, and relative vertical movement of the frame member in relation to the base are permitted, a screen deck yieldably mounted on said intermediate frame member for longitudinal vibratory movement in relation thereto, and means for vibrating said screen deck.

2. In a screening device, a normally fixed base, an intermediate frame member positioned above said base, a plurality of yielding supporting connections between said base and said intermediate frame member, aligned along a pair of opposite sides only of said frame member, said yielding connections including stems secured to said intermediate frame member, abutments on said base, and coil springs surrounding said stems and compressed against said abutments, whereby a substantially longitudinal vibratory movement of the intermediate frame member in relation to the base, and relative vertical movement of the frame member in relation to the base are permitted, a screen deck yieldably mounted on said intermediate frame member for longitudinal vibratory movement in relation thereto, and means for vibrating said screen deck.

LOREN G. SYMONS.